United States Patent

Chopping

Patent Number: 5,923,669
Date of Patent: Jul. 13, 1999

[54] ADAPTIVE BOUNDARY BUFFERS

[75] Inventor: Geoffrey Chopping, Wimbourne, United Kingdom

[73] Assignee: GPT Limited, United Kingdom

[21] Appl. No.: 08/704,552

[22] PCT Filed: Mar. 28, 1995

[86] PCT No.: PCT/GB95/00695

§ 371 Date: Oct. 22, 1996

§ 102(e) Date: Oct. 22, 1996

[87] PCT Pub. No.: WO95/27351

PCT Pub. Date: Oct. 12, 1995

[30] Foreign Application Priority Data

Mar. 30, 1994 [GB] United Kingdom .................. 9406324

[51] Int. Cl.$^6$ .............................. H04J 3/06; H04L 25/36
[52] U.S. Cl. ....................... 370/516; 370/518; 375/372; 375/358
[58] Field of Search ..................................... 370/516, 518, 370/357, 358; 375/371, 372, 376, 373, 375, 355, 356, 357, 358

[56] References Cited

U.S. PATENT DOCUMENTS

| | | | |
|---|---|---|---|
| 4,831,637 | 5/1989 | Lawrence et al. ...................... | 375/376 |
| 5,245,636 | 9/1993 | Sari et al. ............................... | 375/372 |
| 5,268,936 | 12/1993 | Bernardy ............................... | 375/372 |
| 5,517,521 | 5/1996 | Strawn ................................... | 370/516 |

FOREIGN PATENT DOCUMENTS 530 775 A2   3/1993   European Pat. Off. .

OTHER PUBLICATIONS

Annual Review of Communications, vol. 47, 1993—1994, Illinois, U.S., pp. 783–789, XP 000455396, Beecher, P.A., "Sonet Conformance Testing", see p. 786, right col., par. 4—p. 787, left col., par. 1, Fig. 3.

ICC'79. 1979 International Conference on Communications, Boston, MA, USA, 10–14, Jun. 1979, vol. 1, 1979, New York, NY, IEEE, pp. 11.6/1–6, Okimi K, et al., "Toward future standardization of synchronous digital terminals", see p. 11.6.2, right col., par. 3.1—p. 11.6.3, left col., par. 3.2, see p. 116.5, right col., par. 4.4; Figs. 4, 5, 10A, 10B.

*Primary Examiner*—Chi H. Pham
*Assistant Examiner*—Steven Nguyen
*Attorney, Agent, or Firm*—Kirschstein, et al.

[57] ABSTRACT

The fitting of boundary buffers on the exit from a telecommunications network can greatly reduce the relative wander. Adaptive boundary buffers have a phase adjusting circuit, for determining the phase error between a recovered line clock and a recovered return clock from receiving equipment of a telecommunications system, the phase of the recovered return clock being advanced or retarded by the value of the phase error and the phase of the recovered line clock being retarded or advanced respectively by less than the value of the phase error, so as to produce a phase adjusted Output Line Clock.

6 Claims, 2 Drawing Sheets

ADAPTIVE BOUNDARY BUFFERS

BACKGROUND OF THE INVENTION

There are two separate justification techniques at the Virtual Container 12 (VC12) level within Synchronous Digital Hierarchy (SDH). These are byte and bit justification and they are both used at the same time within SDH, but not in the initial justification process at the entry point to the SDH network.

By initially using both techniques, Complementary Justification eliminates the possibility of a large amount of wander being introduced by an SDH network.

Reducing the amount of network wander enables the size of any boundary buffer to be reduced.

The fitting of boundary buffers on the exit from an SDH or other network can greatly reduce the relative wander by of the order of 80% for SDH or other networks on the links not currently being used for synchronisation, whilst not reducing relative wander on the links used for synchronisation.

Complementary Justification is described in our co-filed application, U.S. Ser. No. 08/762,967, filed Dec. 6, 1996, now allowed which is a continuation-in-part of U.S. Ser. No. 08/408,732, filed Mar. 22, 1995, abandoned, which corresponds to GB Publication No. 228,786, imported herein by reference.

Wander on the output of a transmission link may or may not cause slips. The most important factor is how the wander moves relative to the clocking source of the receiving equipment.

If the clock source of the receiving unit is made available to a boundary buffering device, then it is possible that the buffer can phase adjust the output of the transmission link so that it tracks fairly closely to tie receiving equipment clocking source and when this is possible slips can virtually be eliminated. This reduces the relative wander between the tributary and the clock of the receiving equipment.

Examples of five Receiving Equipment configurations are
(a) Single input Multiplexor, without aligner, looping the received recovered clock to drive the return interface.
(b) Single input Multiplexor, without aligner, with free running clock to drive the return interface.
(c) One input with aligner, of a multi-input Equipment, where the aligner read clock is from another input or internal source. This clock is also used to drive the return interface.
(d) One input, of a multi-input Equipment, whose recovered clock is used as the aligner read clock for another input and is also used to drive the return interface.
(e) One input with aligner, of a multi-input Equipment, where the aligner read clock is from another input or internal source. The received input clock is used to drive the return interface.

The effects of these configurations on the ideal clock characteristics of the Boundary Buffer Unit are:
(a) Straight through clock in order to minimise wander on return clock into the network.
(b) While this is not critical a straight through clock is preferable.
(c) Such a clock is required to follow the return clock.
(d) Straight through clock.
(e) Straight through clock. (The equipment having an output aligner negates the benefit of a Boundary Buffer.)

These Characteristics lead to the three ideal requirements. The Boundary Buffer
(a) Must not introduce slips.
(b) Should not introduce phase changes when it is carrying a 2048 kbit/s link being used as a reference. (The buffer should introduce a constant delay.)
(c) Should introduce the necessary phase changes when it is not carrying a 2048 kbit/s link being used as a synchronisation reference in order to match the return clock.

In order to make configuration simple and to allow for the receiving equipment to dynamically change its reference selection, the boundary buffer must automatically change between 'b' and 'c' as required. This means that the Boundary Buffer algorithm must compensate for whether the tributary is being used to carry a reference or not. The Boundary Buffer must determine from the return clock whether its tributary is being used as the reference.

An ordinary boundary buffer will meet only requirements 'a' and 'c', as it is not intended to work on reference links. Its usage can lead to provisioning problems. An ordinary boundary buffer is a simplified form of what is described below.

SUMMARY OF THE INVENTION

According to the present invention there is provided a boundary buffer control unit for use in a telecommunications system employing Synchronous Digital Hierarchy (SDH), or other multiplexing means, comprising a phase adjusting means having means for determining the phase error between a recovered line clock and a recovered return clock from receiving equipment of the telecommunications system, the phase of the recovered return clock being advanced or retarded by the value of the phase error and the phase of the recovered line clock being retarded or advanced respectively by less than the value of the phase error, so as to produce a phase adjusted Line Clock.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

In the above two examples it can be said that the output clock must be the same or very nearly the same as the input clock, or else the boundary buffer will overflow or empty totally.

Figure 1:
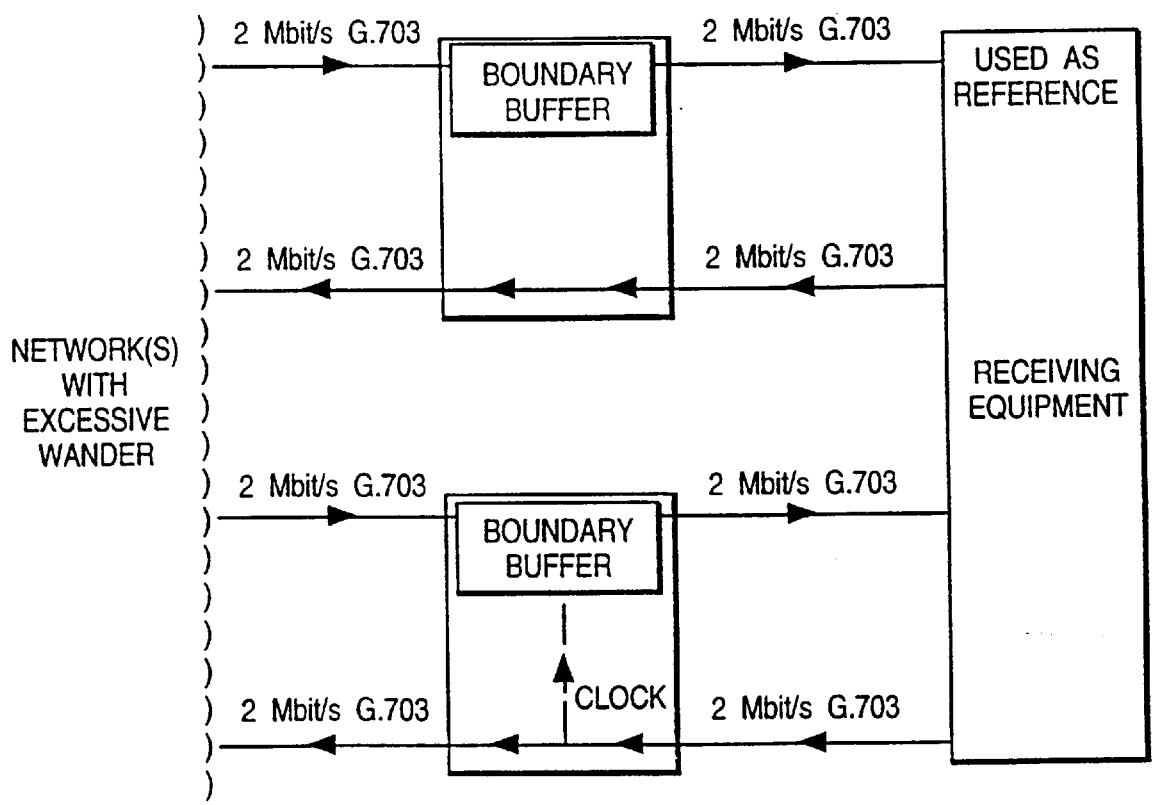
FIG. 1 illustrates two boundary buffers, one on a reference link and one on a non-reference link.
Figure 2:
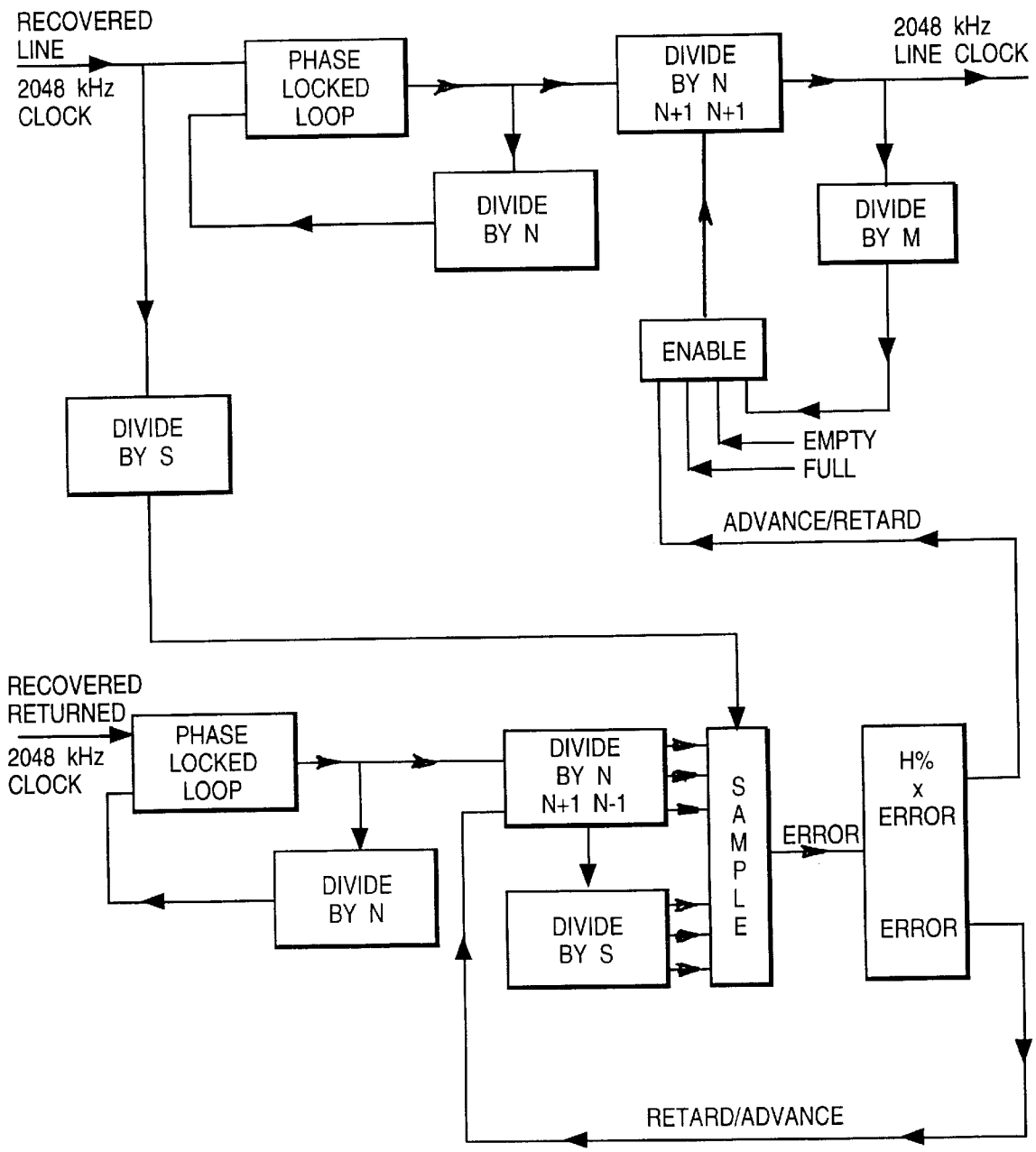
FIG. 2 illustrates a clock control arrangement of the present invention.

The upper part of FIG. 2 shows where the line clock can be recovered and the output Line Clock is advanced or retarded by a small fraction of a bit period (one nth of a period). The fraction of the period must be much less than 0.2 in order to meet the jitter requirements. The divide by M operation limits the rate at which the adjustments can be made relative to the mean recovered Line Clock. (The rate at which the adjustments are made may need to be made programmable to match the characteristics of the Receiving Equipment.

The lower part of the figure shows where the Returned Clock from the receiving Equipment is sampled by the Line Clock to the nearest nth part of a bit period.

The value of the divisor S is such that error is sampled over at least a full frame.

Once a sample has been made and the error detected is sufficient for action to be taken, then a high percentage of the error is used to adjust the phase of the output line clock and the full error is used to adjust the value of the Return Clock Divider.

The Automatic Operation Algorithm is based on the following rules:

1. If the buffer reaches a nearly full indication the output line clock is advanced until the indication is cleared.
2. If the buffer reaches a nearly empty indication the output line clock is retarded until the indication is cleared.
3. As the Phase of the Return Clock varies relative to the phase of Recovered Line Clock, the Phase of the Output Line Clock is adjusted by a fixed high percentage (H %) of the measured phase variation. H is typically 80%.
4. As the Phase of the Return Clock varies relative to the phase of Recovered Line Clock, the Phase of the Return Counter is adjusted by the measured phase variation.

When the Output Line Clock is not used as a reference by the receiving equipment, and provided the Buffer does not reach its end limits, the Output Line Clock will follow the variations of the Return Clock, except that large amounts of wander measured on the Line Clock (relative to the Return Clock) will be attenuated and only L % of the variation will be passed to the output line. L % of the Maximum amount of expected Line Clock wander should be made to be comfortably less than the required wander limit (18 microseconds).

When the Output Line Clock is used as a reference by the receiving equipment the Output Line Clock will initially only be adjusted by L % of the measured phase variation.

The consequential effect of the Return Clock moving by L %, because it is following the Output Line Clock, means that a further change of H×L % should result This in turn leads to further changes of H×L % and H×H×H×L % and so on.

When H+L=1, the summation of the series;
L+HL+HHL+HHHL+HHHHL+etc. is 1.

So consequently the Receiving Equipment should gradually receive the full change, provided the Receiving Equipment has a reasonably linear tracking arrangement.

It has to be assumed that this will work provided that L is not too small. The minimum value for L is likely to be a function of the design of the Receiving Equipment. If L were as low as 10% then 100 microseconds of wander can be reduced to 10 microseconds.

If L is too low the Receive Equipment clock arrangement could become unstable.

The justification technique described in the copending application referred to above is a simple method of eliminating the large phase changes that may occur when changes happen to the SDH synchronisation.

This would mean that the present invention should be able to cope with all other sources of wander from SDH and could be part of the desynchroniser or a separate unit.

Without Complementary justification or other improved rejustification mechanisms the present invention is unlikely to fully cover the total possible excursions of a large SDH network. Either some slips will be accepted or non adaptive Boundary Buffers would have to be employed with the planning restrictions that would bring.

Because SDH Desynchronisers do not require very much buffering in order to meet G.823 jitter requirements, there are only small delay implications of having boundary buffers in separate units. However for ATM where the retiming delays introduced to meet the jitter requirements can be so large, the use of large boundary buffers in separate units would incur more heavy delay.

Adaptive Boundary Buffers are only expected to be able to reduce the wander by a factor of 5 or 10. However where this is satisfactory the adaptive operation is a very useful advantage.

I claim:

1. A boundary buffer control unit for use in a telecommunications system comprising phase adjusting means having means for determining the phase error between a recovered line clock and a recovered return clock from receiving equipment of the telecommunications system, the phase of the recovered return clock being advanced or retarded by the value of the phase error and the phase of the recovered line clock being retarded or advanced respectively by less than the value of the phase error, so as to produce a phase adjusted Output Line Clock.

2. A control unit as claimed in claim 1, further comprising buffer content control means for preventing the buffer overflowing or becoming empty.

3. A control unit as claimed in claim 1, further comprising means for adjusting the frequency of the phase adjustment.

4. A control unit as claimed in claim 1, wherein the phase error is determined less than once per frame.

5. A control unit as claimed in claim 1, wherein the rate of adjustment is programmable.

6. A control unit as claimed in claim 1 employing Synchronous Digital Hierarchy.

* * * * *